United States Patent [19]
Groening

[11] Patent Number: 5,752,543
[45] Date of Patent: May 19, 1998

[54] DRUM CONTAINMENT DOLLY

[76] Inventor: Mark R. Groening, 8033 Jim Ct. SE., Olympia, Wash. 98503

[21] Appl. No.: 767,074

[22] Filed: Dec. 16, 1996

Related U.S. Application Data

[60] Provisional application No. 60/008,749 Dec. 18, 1995.

[51] Int. Cl.$^6$ .................. B62B 3/00; B65D 25/28
[52] U.S. Cl. .......... 137/312; 220/571; 222/108; 248/129; 280/79.5
[58] Field of Search .......... 137/312; 220/571; 222/108; 248/129; 280/79.5

[56] References Cited

U.S. PATENT DOCUMENTS

| | | | |
|---|---|---|---|
| D. 133,125 | 7/1942 | Wadley | D34/18 |
| 473,381 | 4/1892 | Carr | 248/129 |
| 1,700,274 | 1/1929 | Smye | 211/68 |
| 2,152,217 | 3/1939 | Shaw | 280/50 |
| 2,688,493 | 9/1954 | Rosenberg | 280/36 |
| 3,218,090 | 11/1965 | Herman | 280/47.26 |
| 3,894,753 | 7/1975 | Ickes | 280/47.34 |
| 4,222,580 | 9/1980 | Krokonko | 280/47.34 |
| 4,640,521 | 2/1987 | Berfield | 280/47.34 |
| 4,641,680 | 2/1987 | Been | 137/312 |
| 4,775,067 | 10/1988 | Mount | 220/1 C |
| 4,862,909 | 9/1989 | Kim | 137/150 |
| 5,417,344 | 5/1995 | Wells et al. | 220/571 |
| 5,480,191 | 1/1996 | Litin et al. | 220/571 |

*Primary Examiner*—George L. Walton
*Attorney, Agent, or Firm*—Thomason & Moser

[57] ABSTRACT

A drum containment dolly for liquid waste containment drums. The drum containment dolly has a containment vessel having a volume that is greater than the volume of the containment drum carried by the dolly. As such, should a leak form in the drum, the dolly fully retains all the liquid waste leaked from the liquid waste containment drum. Specifically, the drum containment dolly has a polygonal base, a plurality of side panels attached to the base to form the containment vessel, and means for moving the drum containment dolly. In a particular embodiment of the invention, a plurality of wheels are attached to a hexagonal base and the liquid waste containment drum is positioned vertically relative to the hexagonal base.

16 Claims, 1 Drawing Sheet

DRUM CONTAINMENT DOLLY

This application claims the benefit of U.S. Provisional application No. 60/008,749 filed Dec. 18, 1995.

BACKGROUND OF THE DISCLOSURE

1. Field of the Invention

The present invention relates to a dolly for liquid waste containment drums, and more particularly, to a dolly capable of retaining liquid waste leaked from a liquid waste containment drum.

2. Description of the Background Art

The prior art teaches numerous types of leak containment pans for liquid waste containers, including U.S. Pat. No. 4,862,909 issued Sep. 5, 1989, which teaches a drainage pan for a liquid waste container that includes a Z-bar suction pump assembled with the wall thereof for draining liquid waste leaked from the liquid waste container. This drainage pan is stationary.

U.S. Pat. No. 5,417,344 issued May 23, 1995 teaches a secondary containment apparatus capable of storing a primary container on a wheeled platform such that the secondary containment apparatus retains any leak from the primary container. The secondary containment apparatus substantially encloses the primary container and is designed to transport the primary container in a horizontal position.

This design is complex, cumbersome, and not well suited for arranging the primary containers in a space efficient manner.

Heretofore, containment dollies have not been capable of retaining the full capacity of the containment drum upon a leak from the containment drum, nor have containment dollies been shaped such that they can be arranged in an orderly and space efficient manner.

Therefore, there is a need in the art for a space efficient containment dolly that is capable of retaining the entire contents of a containment drum being transported or stored by the dolly.

SUMMARY OF THE INVENTION

The disadvantages of the prior art are overcome by the present invention of a drum containment dolly for transporting and storing cylindrical liquid waste containment drums. The inventive drum containment dolly has a containment vessel within which a drum is supported. Upon a leak forming in the containment drum, the inventive dolly fully retains the entire contents leaked from the containment drum, i.e., the volume of the dolly containment vessel is larger than the volume of the drum..

More specifically, the drum containment dolly has a polygonal base having N edges, where N is an integer greater than 1, and a side panel attached to each edge of the base to define the containment vessel. To promote arranging a plurality of dollies and drums in a space efficient manner, the polygonal base is preferably hexagonal shaped. As such, with a hexagonal base, six rectangular sides are welded to the base to form a hexagonal containment vessel. The sizes of the base and sides are selected to produce a vessel having a volume that is larger than the volume of the drum to be stored in the vessel. Generally, the height of the side of the vessel permits the drum to be accessed and lifted using a conventional drum handling forklift, e.g., when storing a conventional 55 gallon drum, at least the second rib of the drum is exposed above the side of the vessel.

For dollies with hexagonal bases, the dollies can be arranged side-by-side with little or no wasted space between the dollies. Additionally, to facilitate easy movement of the dolly while carrying a drum, the base contains a plurality of casters. Movement of the dolly is further enhanced by attachment of a pair of handles to one side of the dolly.

As a result of using the drum containment dolly of the present invention, if a containment drum stored in the dolly should leak, the entire contents of the containment drum is fully retained by the dolly. Additionally, the drum containment dolly can be arranged with other such drum containment dollies in a space efficient manner.

BRIEF DESCRIPTION OF THE DRAWINGS

The teachings of the present invention can be readily understood by considering the following detailed description in conjunction with the accompanying drawing, in which.

DETAILED DESCRIPTION

Figure 1:
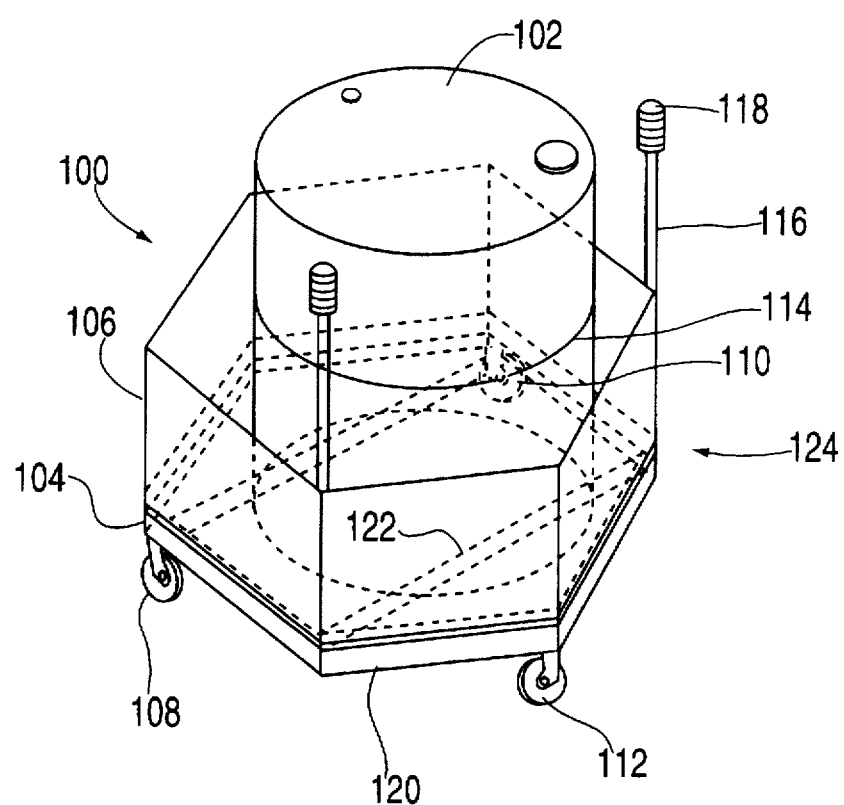
FIG. 1 depicts a perspective view of the present invention retaining a containment drum.

FIG. 1 depicts a perspective view of a drum containment dolly 100 retaining a containment drum 102. The drum containment dolly 100 has a base 104 and a plurality of rectangular side panels 106 where said side panels are connected to one another and to the base to form a containment vessel 124 having a volume equal to or slightly greater than that of the containment drum 102, such that if containment drum 102 forms a leak, e.g., in its bottom, the entire capacity of containment drum 102 can be retained by the containment vessel 124 of the drum containment dolly. In addition, leaks often develop around a drum pump (not shown) which typically extends outwardly from the side or the top of a containment drum for extracting the contents of the drums. Since the footprint of the containment vessel 124 of the dolly is substantially larger than that of the containment drum, the dolly has sufficient clearance to catch drips from the drum pump as well.

The side panels 106 of the drum containment dolly 100 extend from the base member 104 to approximately halfway along the side of the containment drum 102. As such, a forklift with a drum handler attachment can have easy access below the second rib 114 of the containment drum 102, thus facilitating safe removal of the containment drum from the dolly. Maintaining the side member height below the second rib 114 of the containment drum 102 permits easy ingress and egress of the containment drum while still having the capability of retaining the entire contents of the containment drum within the drum containment dolly upon leakage.

To permit the orderly stacking of the drum containment dollies during shipping or storage, the side panels are slightly splayed outwardly such that the open end of the containment vessel of the dolly is slightly larger than the base of the dolly.

To promote portability of the drum containment dolly and its cargo, a plurality of wheels (108, 110, 112) are positioned in the base member 104. The wheels are typically phenolic casters. However, other suitable types of wheels constructed from other materials can be used. For example, dual-wheel hooded casters constructed from rubber or metal are suitable alternatives. Typically, wheels 108 and 110 are fixed position casters, and wheel 112 is a swivel caster.

The drum containment dolly 100 further comprises a pair of steering handles 116. These handles extend from the top of the side panels 106 to approximately a height even with the top of containment drum 102. The distal ends of the

3 steering handles include handle members 118. The pair of steering handles, as well as the three wheels permits easy handling and positioning of the drum containment dolly.

More specifically, the base member 104 has a polygonal plan form, although the base could have circular plan form that is used to form a cylindrical containment vessel. For example, in the preferred embodiment of the invention depicted in FIG. 1, the base member has a hexagonal plan form for receiving a conventional 55 gallon containment drum. Utilizing a hexagonal plan form minimizes the storage area for each drum containment dolly. The drum containment dollies can be stored side by side in a space efficient manner which requires only a minimal amount of storage area. Each of the six side panels 106 extends from the base member by approximately 15 inches. The wheels maintain the base member approximately 7 inches above a floor. Each side panel 106 has a rectangular plan form with an approximate width of 19 inches. These dimensions are illustrative of a drum containment dolly 100 that is designed to receive a standard 55 gallon containment drum. However, the dimensions of the drum containment dolly 100 can be modified to accommodate containment drums of different sizes.

The preferred embodiment of the invention is fabricated by welding six (6) 3-inch angle braces 120 into a hexagonal pattern to form a frame. In addition, two (2) cross braces 122 are welded to the 3-inch angle braces as shown in FIG. 1. Each cross brace 122 has an approximate length of 38 inches. A hexagonal steel plate is then welded to the six (6) 3-inch angle panel braces and the two cross braces. The casters 108, 110 and 112 are mounted to the bottom of the base member 104 or to the braces. The side panels 106 are welded to the 3-inch angle side braces and to one another to form a sealed containment vessel 124. Steering handles 116 are welded to the side panels. A drain plug (not shown) can be added to the bottom of base member 104, such that liquid that has leaked into the drum containment dolly can be easily drained therefrom for appropriate storage or disposal.

Alternatively, the welded metal sealed containment vessel 124 can be formed through the process of injection molding from a suitable material such as fiberglass or plastic. The specific material can be selected to address different types of potentially caustic liquids that may leak into the drum containment dolly.

Finally, the large volume capacity of the drum containment dolly, as well as its ability to stack conveniently side by side with other drum containment dollies, reduces the migration of heavier than air vapors that may be emitted by liquids within the drums. These emitted vapors will generally migrate or hover near the ground level. By stacking the substantially hexagonal-shaped drum containment dollies side by side, the migration of the emitted vapor is substantially impeded by the side panels of the drum containment dollies.

In summary, the drum containment dolly provides the advantages of retaining the entire contents of a containment drum within the drum containment dolly upon leakage, having low side panels to provide easy ingress and egress of the containment drum, having a minimal footprint for arranging the drum containment dollies in a space efficient manner and portability of the containment drum.

Although one embodiment which incorporates the teaching of the present invention has been shown and described in detail herein, those skilled in the art can readily devise many other varied embodiments that still incorporate these teachings.

4

What is claimed is:

1. A drum containment dolly for containing a containment drum for storing a volume of liquid, said containment drum having a bottom, a top and a cylindrical side, comprising:

a containment vessel having a polygonal base for supporting the bottom of the containment drum to maintain the drum in a vertical orientation, said polygonal base having N edges, where N is an integer greater than 1, and a side panel extending from each of the N edges of the base, where the containment vessel has an internal volume that is greater than the liquid volume of said containment drum to retain the entire liquid volume of said containment drum if a leak occurs in said containment drum and said side panels extend partially along the cylindrical side of said containment drum to allow for easy grasping of the cylindrical side of said containment drum to facilitate removal of the containment drum from the containment vessel.

2. The drum containment dolly of claim 1, further comprising:

means, attached to said polygonal base, for moving the drum containment dolly.

3. The drum containment dolly of claim 2, wherein said means for moving further comprises a steering handle attached to at least one side panel.

4. The drum containment dolly of claim 1, wherein said means for moving comprises a plurality of wheels.

5. The drum containment dolly of claim 4, wherein the plurality of wheels comprises:

a pair of fixed casters; and a swivel caster.

6. The drum containment dolly of claim 1, wherein the polygonal base is hexagonal.

7. The drum containment dolly of claim 1, further comprising:

an angle brace attached to each edge of said polygonal base; and a cross brace extending across the polygonal base and attached to two of said angle braces, where each side panel is supported by an angle brace approximately perpendicular to the polygonal base.

8. A drum containment dolly, for containing a containment drum holding a liquid, said containment drum having a bottom, a top and a cylindrical side, comprising:

a hexagonal base for supporting the bottom of the containment drum to maintain the drum in a vertical orientation, said hexagonal base having six edges, where each of the edges is attached to an angle brace;

a pair of cross braces extending across said hexagonal base and being attached to at least two of said angle braces;

six side panels, where each side panel is attached to one of said angle braces and is supported approximately perpendicular to said hexagonal base, said hexagonal base and said side panels define a containment vessel having an internal volume that is larger than the liquid volume of the containment drum to retain the entire liquid volume of said containment drum if a leak occurs in said containment drum, and said side panels extend partially along the cylindrical side of said containment drum to allow for easy grasping of the cylindrical side of said containment drum to facilitate removal of the containment drum from the containment vessel;

a plurality of wheels attached to the angle braces; and a steering handle attached to the plurality of side panels.

9. The drum containment dolly of claim 8, wherein the plurality of wheels comprises:

a pair of fixed casters; and a swivel caster.

10. A drum containment dolly for containing an internal containment drum for storing a volume of liquid, said containment drum having a bottom, a top and a cylindrical side, where said cylindrical side contains at least one rib, comprising:

a containment vessel having a polygonal base for supporting the bottom of the containment drum to maintain the drum in a vertical orientation, said polygonal base having N edges, where N is an integer greater than 1, and a side panel extending from each of the N edges of the base, where the containment vessel has a volume that is greater than the liquid volume of said containment drum to retain the entire liquid volume of said containment drum if a leak occurs in said containment drum and said side panels extend partially along the cylindrical side of said containment drum to expose the at least one rib above the side panels to allow for easy grasping of the cylindrical side of said containment drum to facilitate removal of the containment drum from the containment vessel.

11. The drum containment dolly of claim 10, further comprising:

means, attached to said polygonal base, for moving the drum containment dolly.

12. The drum containment dolly of claim 11, wherein said means for moving further comprises a steering handle attached to at least one side panel.

13. The drum containment dolly of claim 10, wherein said means for moving comprises a plurality of wheels.

14. The drum containment dolly of claim 13, wherein the plurality of wheels comprises:

a pair of fixed casters; and a swivel caster.

15. The drum containment dolly of claim 10, wherein the polygonal base is hexagonal.

16. The drum containment dolly of claim 10, further comprising:

an angle brace attached to each edge of said polygonal base; and a cross brace extending across the polygonal base and attached to two of said angle braces, where each side panel is supported by an angle brace approximately perpendicular to the polygonal base.

* * * * *